United States Patent
Wu et al.

(10) Patent No.: US 10,203,407 B2
(45) Date of Patent: Feb. 12, 2019

(54) ILLUMINATION DEVICE AND DETECTION METHOD THEREOF

(71) Applicant: HTC Corporation, Taoyuan (TW)

(72) Inventors: Chun-Yih Wu, Taoyuan (TW); Yen-Liang Kuo, Taoyuan (TW); Chih-Jen Hu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 499 days.

(21) Appl. No.: 14/945,628

(22) Filed: Nov. 19, 2015

(65) Prior Publication Data

US 2017/0146650 A1 May 25, 2017

(51) Int. Cl.
*G01S 13/86* (2006.01)
*F21V 7/00* (2006.01)
*F21V 33/00* (2006.01)
*G01S 13/88* (2006.01)

(52) U.S. Cl.
CPC ........... *G01S 13/86* (2013.01); *F21V 7/00* (2013.01); *F21V 33/0076* (2013.01); *G01S 13/88* (2013.01)

(58) Field of Classification Search
CPC ........ G01S 13/86; G01S 13/88; G01S 13/886; F21V 7/00; F21V 33/0076; F21V 33/0064; F21V 23/0471; G08B 13/18; G08B 13/184; G08B 13/187; G08B 13/19; G08B 21/04; G08B 21/0415; G08B 21/043; G08B 21/0407; G08B 21/06
See application file for complete search history.

(56) References Cited

U.S. PATENT DOCUMENTS

| 7,567,200 B1* | 7/2009 | Osterweil | A61B 5/1117 340/573.1 |
|---|---|---|---|
| 7,916,066 B1 | 3/2011 | Osterweil | |
| 8,742,935 B2 | 6/2014 | Cuddihy et al. | |
| 2003/0169053 A1* | 9/2003 | Fujiwara | G01S 7/06 324/642 |
| 2009/0267525 A1* | 10/2009 | Zheng | F21S 8/086 315/159 |
| 2011/0193467 A1* | 8/2011 | Grajcar | F21V 19/003 313/113 |
| 2012/0286672 A1* | 11/2012 | Holland | H05B 37/0272 315/154 |
| 2014/0155729 A1* | 6/2014 | Saitoh | G01S 13/40 600/407 |
| 2014/0292194 A1* | 10/2014 | Sagal | H05B 37/0227 315/34 |

(Continued)

FOREIGN PATENT DOCUMENTS

| CN | 102804493 A | 11/2012 |
|---|---|---|
| CN | 103017012 A | 4/2013 |

(Continued)

*Primary Examiner* — Peter M Bythrow
*Assistant Examiner* — Daniel P Malley, Sr.
(74) *Attorney, Agent, or Firm* — Birch, Stewart, Kolasch & Birch, LLP (57) ABSTRACT

An illumination device is provided. The illumination device includes a lamp body, a stage, at least one first light source, a first radiator, and a first feed conductor. The stage is disposed in the lamp body. The first light source is disposed on the stage. The first opening is formed on the first radiator, the first light source corresponds to the first opening, and the first radiator transmits a first wireless signal. The first feed conductor is connected to the first radiator.

13 Claims, 10 Drawing Sheets

(56) References Cited

U.S. PATENT DOCUMENTS

2015/0282272 A1* 10/2015 Borsoi ................... G01S 13/04
                                                        315/34
2015/0327349 A1* 11/2015 Lee ........................ F21K 9/232
                                                        362/294
2016/0187476 A1*  6/2016 Wang ..................... G01S 13/42
                                                        342/52

FOREIGN PATENT DOCUMENTS

| CN | 103636293 A | 3/2014 |
| CN | 104950303 A | 9/2015 |
| TW | M480753 U | 6/2014 |
| WO | WO 2012/158840 A1 | 11/2012 |
| WO | WO 2015/102713 A2 | 7/2015 |

\* cited by examiner

ILLUMINATION DEVICE AND DETECTION METHOD THEREOF

BACKGROUND OF THE INVENTION

Field of the Invention

The present invention relates to an illumination device, and in particular to an illumination device with a detection function.

Description of the Related Art

Figure 1:
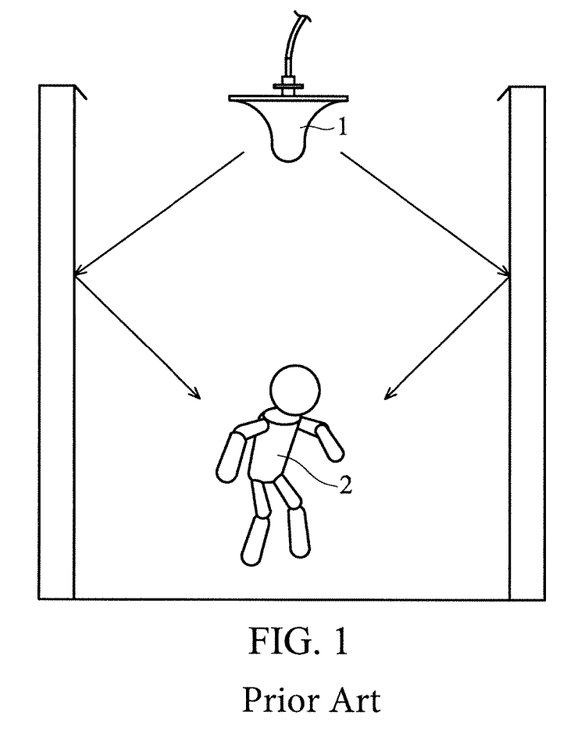
FIG. 1 shows a conventional detection device monitoring a user.

With reference to FIG. 1, in elder care products, fall prevention is an important technology. The most dangerous place in a house is the bathroom. Conventionally, a detection device 1 with monopole antennas is utilized along with mathematical algorithms to detect the substantial action of the user 2 on the floor 11, and to detect when he or she has fallen down. However, when such a fall occurs, the user is lying on the floor. In order to also be able to detect signs of life in the user, the direction of the antenna beam must be changed to get a better radar cross section and echo characteristics. In a conventional detection device 1, the direction of the monopole antennas is fixed, and the direction of the antenna beam cannot be changed.

BRIEF SUMMARY OF THE INVENTION

An illumination device is provided. The illumination device includes a lamp body, a stage, at least one first light source, a first radiator and a first feed conductor. The stage is disposed in the lamp body. The first light source is disposed on the stage. The first opening is formed on the first radiator, the first light source corresponds to the first opening, and the first radiator transmits a first wireless signal. The first feed conductor is connected to the first radiator.

Utilizing the first embodiment of the invention, a first antenna unit (the first radiator and the second radiator) and the second antenna unit (the first monopole antenna and the second monopole antenna) provide two different radiation directions (the first wireless signal and the second wireless signal), and the state of the user in different positions and postures can be detected.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 2:
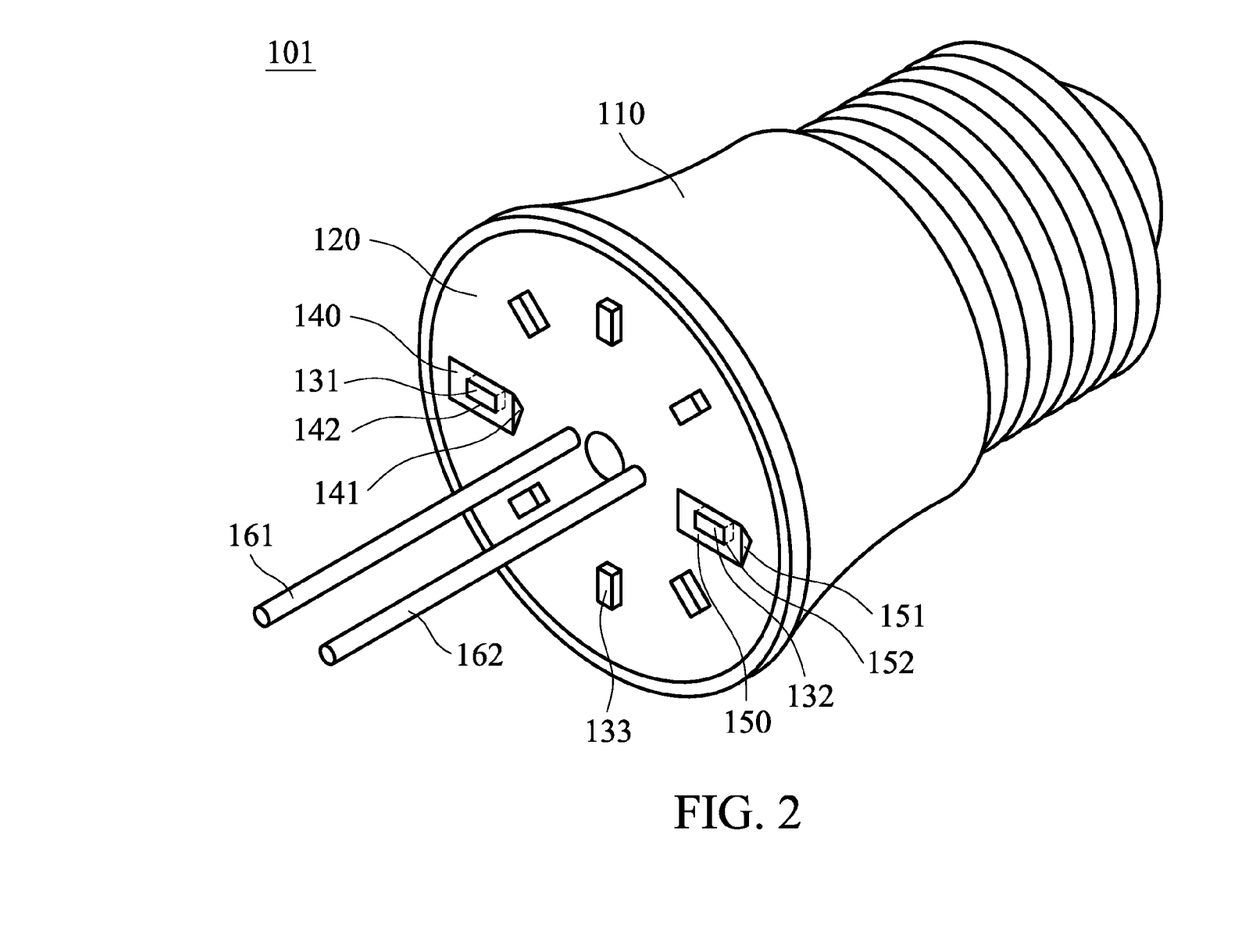
FIG. 2 shows an illumination device of a first embodiment of the invention.

FIG. 2 shows an illumination device 101 of a first embodiment of the invention. The illumination device 101 includes a lamp body 110, a stage 120, a first light source 131, a second light source 132, a first radiator 140, a first feed conductor 141, a second radiator 150, a second feed conductor 151, a first monopole antenna 161, a second monopole antenna 162 and a plurality of third light sources 133. The stage 120 is disposed in the lamp body 110. The first light source 131, the second light source 132 and the third light sources 133 are disposed on the stage 120. The first light source 131, the second light source 132 and the third light sources 133 are arranged annularly.

With reference to FIG. 2, at least one first opening 142 is formed on the first radiator 140. The first light source 131 corresponds to the first opening 142. The first radiator 140 transmits a first wireless signal. The first feed conductor 141 is connected to the first radiator 140. The second opening 152 is formed on the second radiator 150. The second light source 132 corresponds to the second opening 152. The second radiator 150 transmits the first wireless signal. The second feed conductor 151 is connected to the second radiator 150. The first radiator 140 emits the first wireless signal, and the second radiator 150 receives the first wireless signal.

With reference to FIG. 2, the first monopole antenna 161 is disposed on the stage 120, wherein the first monopole antenna 161 emits a second wireless signal. The second monopole antenna 162 is disposed on the stage 120, wherein the second monopole antenna 162 receives the second wireless signal.

Figure 3A:
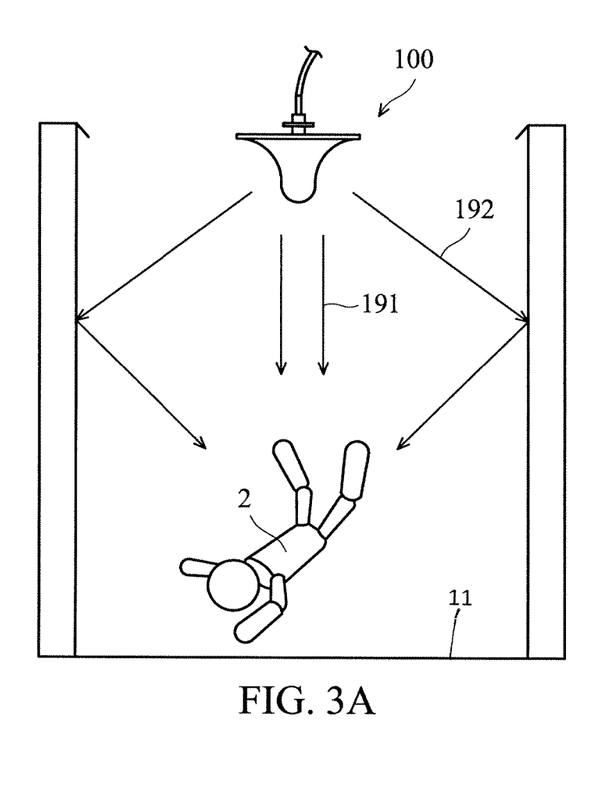
FIG. 3A shows the illumination device of the first embodiment monitoring the user.
Figure 3B:
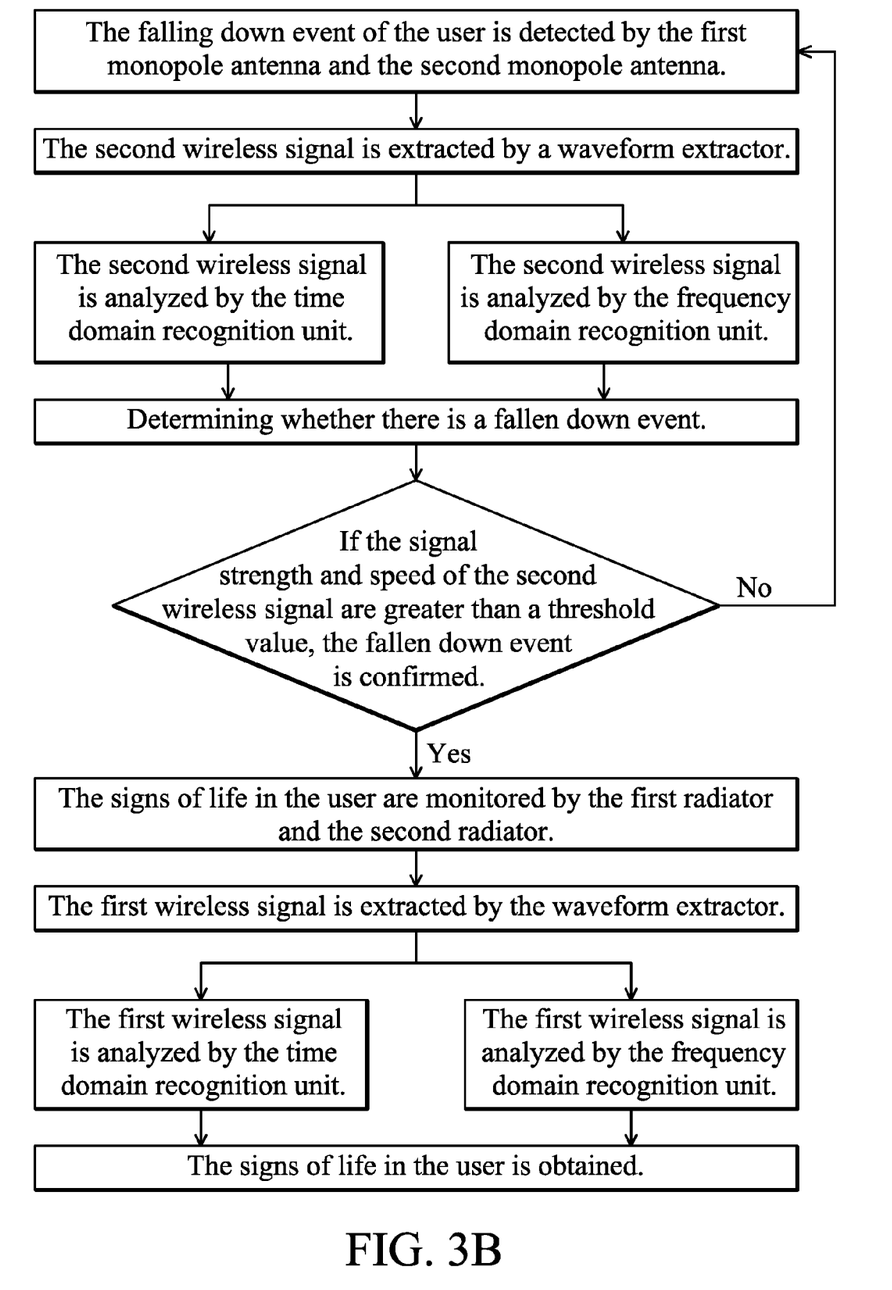
FIG. 3B shows the detection steps of the illumination device of the first embodiment.

In one embodiment, the first radiator 140 and the second radiator 150 have a first main radiation direction. The first main radiation direction is parallel to a vertical direction (when the illumination device 101 is disposed on a ceiling, the light of the illumination device 101 is emitted downward along the vertical direction). The first monopole antenna 161 and the second monopole antenna 162 have a second main radiation direction. The second main radiation direction is not parallel to the vertical direction With reference to FIG. 3A, utilizing the first embodiment of the invention, a first antenna unit (the first radiator 140 and the second radiator 150) and a second antenna unit (the first monopole antenna 161 and the second monopole antenna 162) provide two different radiation directions (the first wireless signal 191 and the second wireless signal 192), and the state of the user in different positions and postures can be detected. In one embodiment, the first monopole antenna 161 and the second monopole antenna 162 detect a falling down event by monitoring whether the user experiences a sudden movement. When the falling down event has been detected, the user is in the prone position, and the first radiator 140 and the second radiator 150 check for signs of life in the user 2. Specifically, FIG. 3B shows the monitoring process of an embodiment of the invention. First, the falling down event of the user is detected by the first monopole antenna and the second monopole antenna. The second wireless signal is extracted by a waveform extractor, and the signal strength and speed of the second wireless signal are analyzed by a time domain recognition unit and a frequency domain recognition unit. If the signal strength and speed of the second wireless signal are greater than a threshold value, the falling down event is confirmed, and an alarm signal is emitted. Then, signs of life in the user are monitored by the first radiator and the second radiator. The first wireless signal is extracted by the waveform extractor, and the signal strength and speed of the first wireless signal are analyzed by the time domain recognition unit and the frequency domain recognition unit. The signal strength and speed of the first wireless signal are recorded to monitor the user's life signs.

Figure 4A:
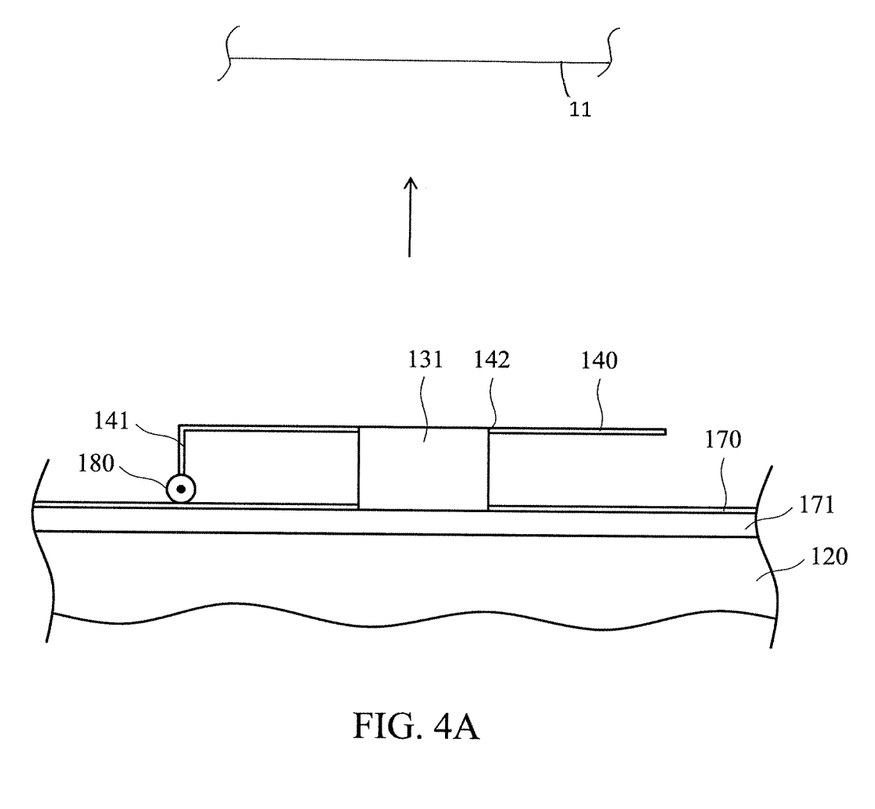
FIG. 4A shows the detailed structure of the illumination device of the first embodiment.

With reference to FIG. 4A, in one embodiment, the illumination device 101 further comprises a reflector 170. The reflector 170 is disposed on the stage 120. The first light source 131 is disposed on the reflector 170, and is connected to a circuit board 171. In one embodiment, the reflector 170 is made of conductive material, and the reflector 170 is grounded. The feed conductor 141 is connected to a feed source 180.

Figure 4B:
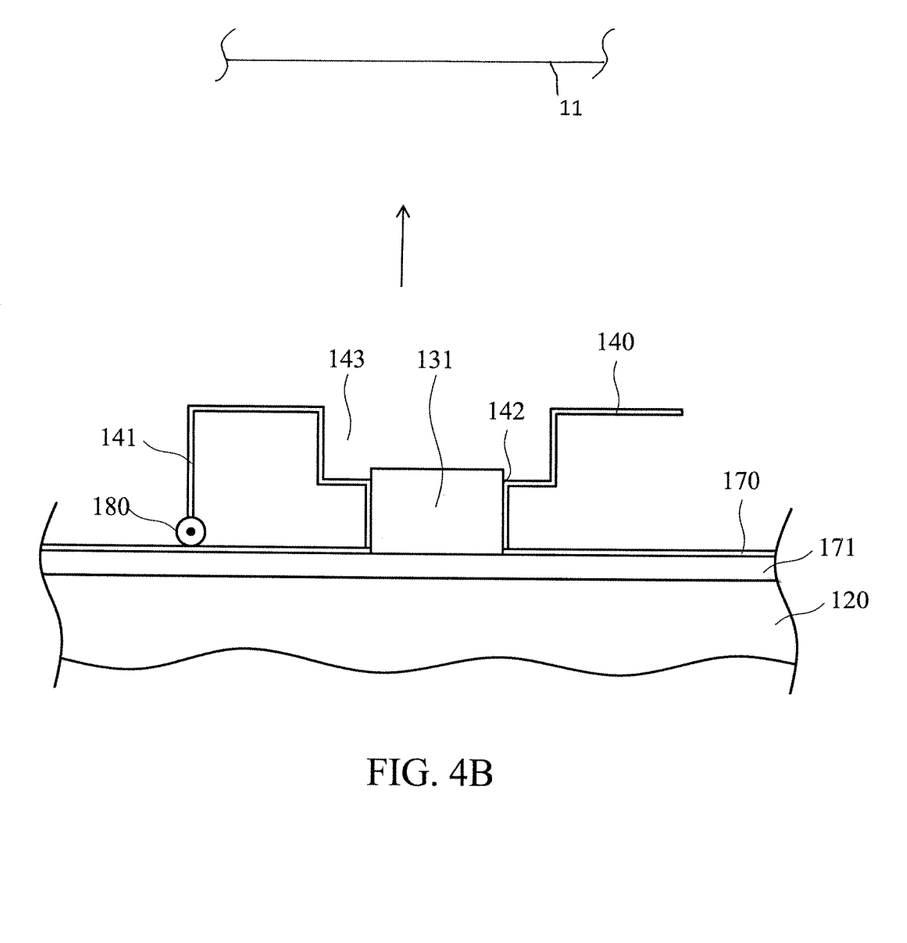
FIG. 4B shows a modified example of the embodiment of FIG. 4A.

With reference to FIG. 4B, in one embodiment, a recess 143 is formed on the first radiator 140. The first opening 142 is formed on the bottom of the recess 143. In this embodiment, the first light source 131 is disposed in the recess 143, and is connected to the circuit board 171. The reflector 170 is made of conductive material, and the reflector 170 is grounded. The bottom of the recess 143 contacts the reflector 170. The feed conductor 141 is connected to a feed source 180.

Figure 5:
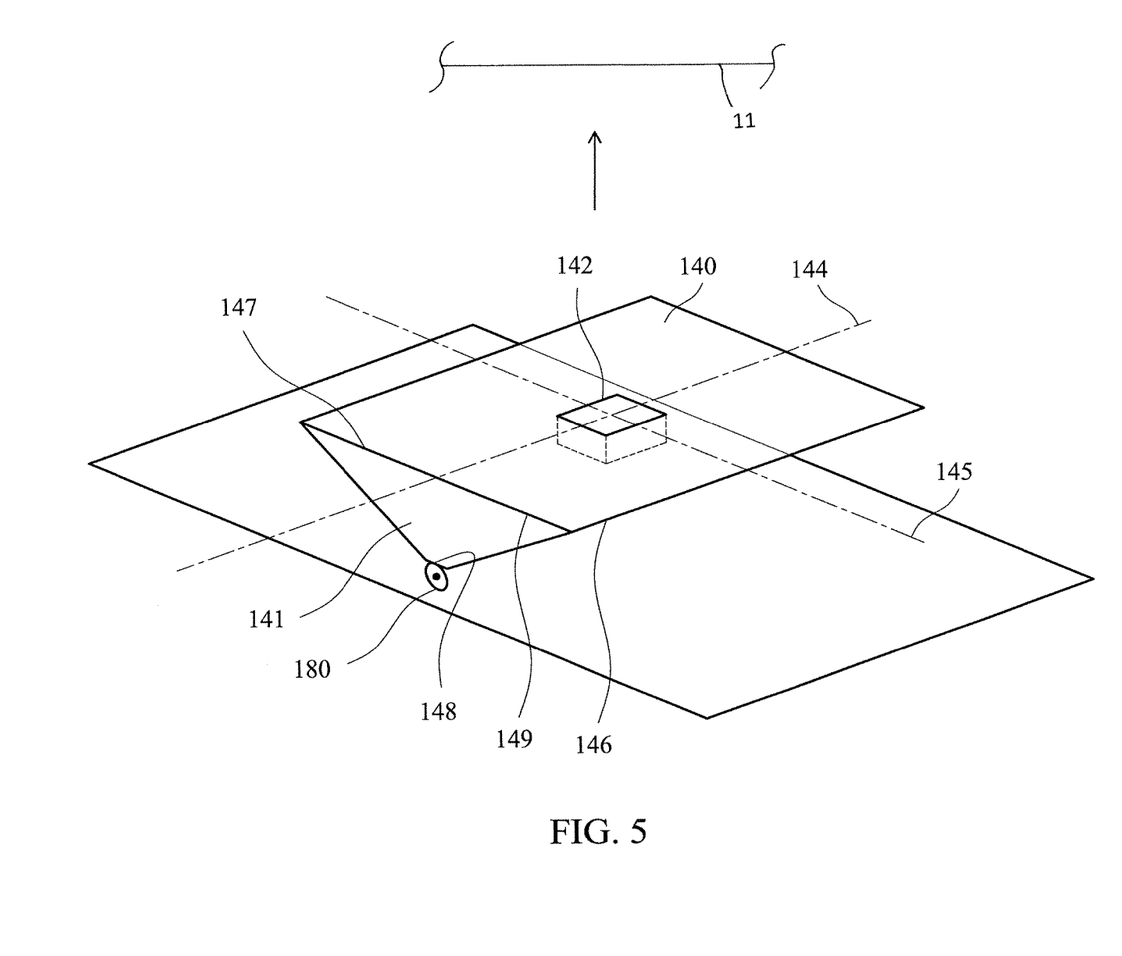
FIG. 5 shows the detailed structure of the first radiator of the first embodiment.

With reference to FIG. 5, in one embodiment, the first radiator 140 is rectangular. The first radiator 140 comprises a first axis 144, a second axis 145, a first side 146 and a second side 147. The first axis 144 is perpendicular to the second axis 145. The first side 146 is parallel to the first axis 144. The second side 147 is parallel to the second axis 145. The first feed conductor 141 connects the first radiator 140 at the second side 147. The first opening 142 is located on the second axis 145. A length of the first side 146 is a half of an operation wavelength of the first wireless signal. In one embodiment, the first feed conductor 141 is an isosceles triangle. The first feed conductor 141 has a top portion 148 and a bottom edge 149. The top portion 148 corresponds to the first axis 144. The top portion 148 is connected to the feed source 180. Utilizing the embodiment above, the first light source is disposed on a zero point of an electric field of the first radiator. Therefore, the light sources are incorporated with the radiators without changing the antenna characteristics.

In the embodiments of the invention, the design of the second radiator 150 is similar to the design of the first radiator 140. The description of the second radiator 150 is therefore omitted.

Figure 6A:
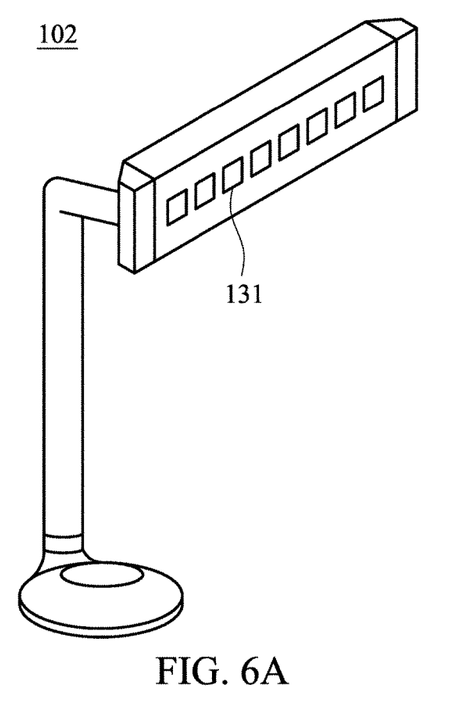
FIG. 6A shows an illumination device of a second embodiment of the invention.
Figure 6B:
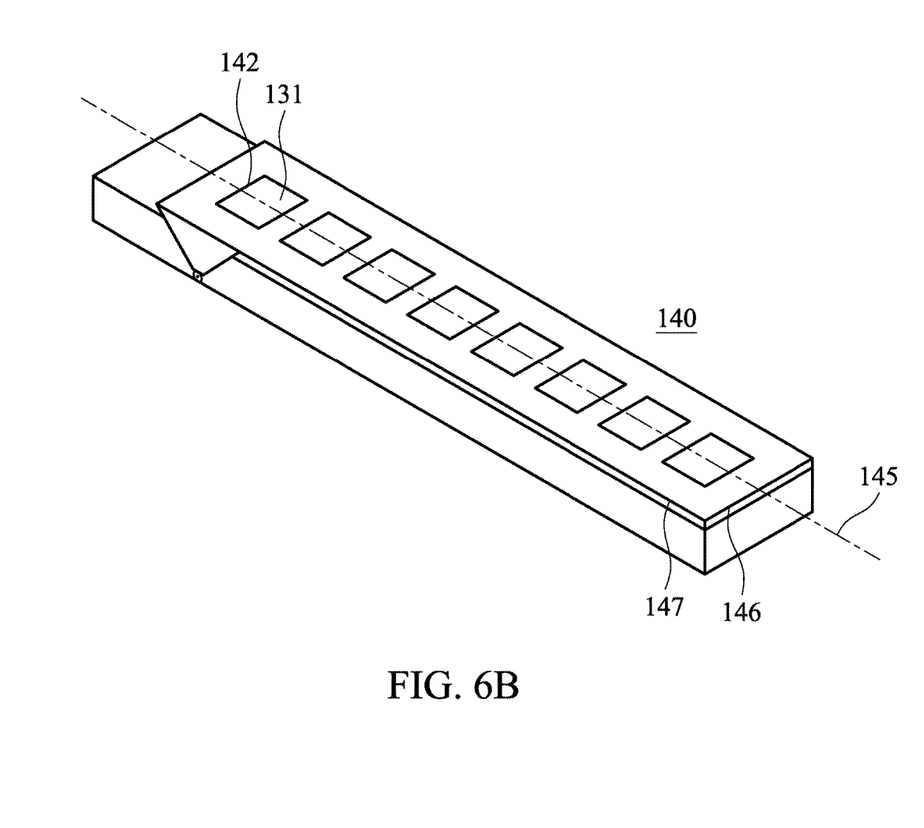
FIG. 6B shows the detailed structure of the first radiator of the second embodiment.

FIGS. 6A and 6B show an illumination device 102 of a second embodiment of the invention, wherein only the planar antennas are utilized (only the first radiator is utilized, or, only the first and second radiators are utilized). The illumination device 102 comprises a plurality of first light sources 131 and a plurality of first openings 142. The first light sources 131 respectively disposed in the first openings 142, and the first openings 142 are arranged along the second axis 145. In this embodiment, the length of the second side 147 is greater than the operation wavelength of the first wireless signal. The illumination device 102 of the second embodiment can be utilized to detect biological signals (for example, heart beat or breathing). In one embodiment, the illumination device 102 of the second embodiment further includes a sedentariness-reminder function. When the illumination device 102 has detected the user is sitting sedentarily, the illumination device 102 reminds the user to move up.

Figure 7:
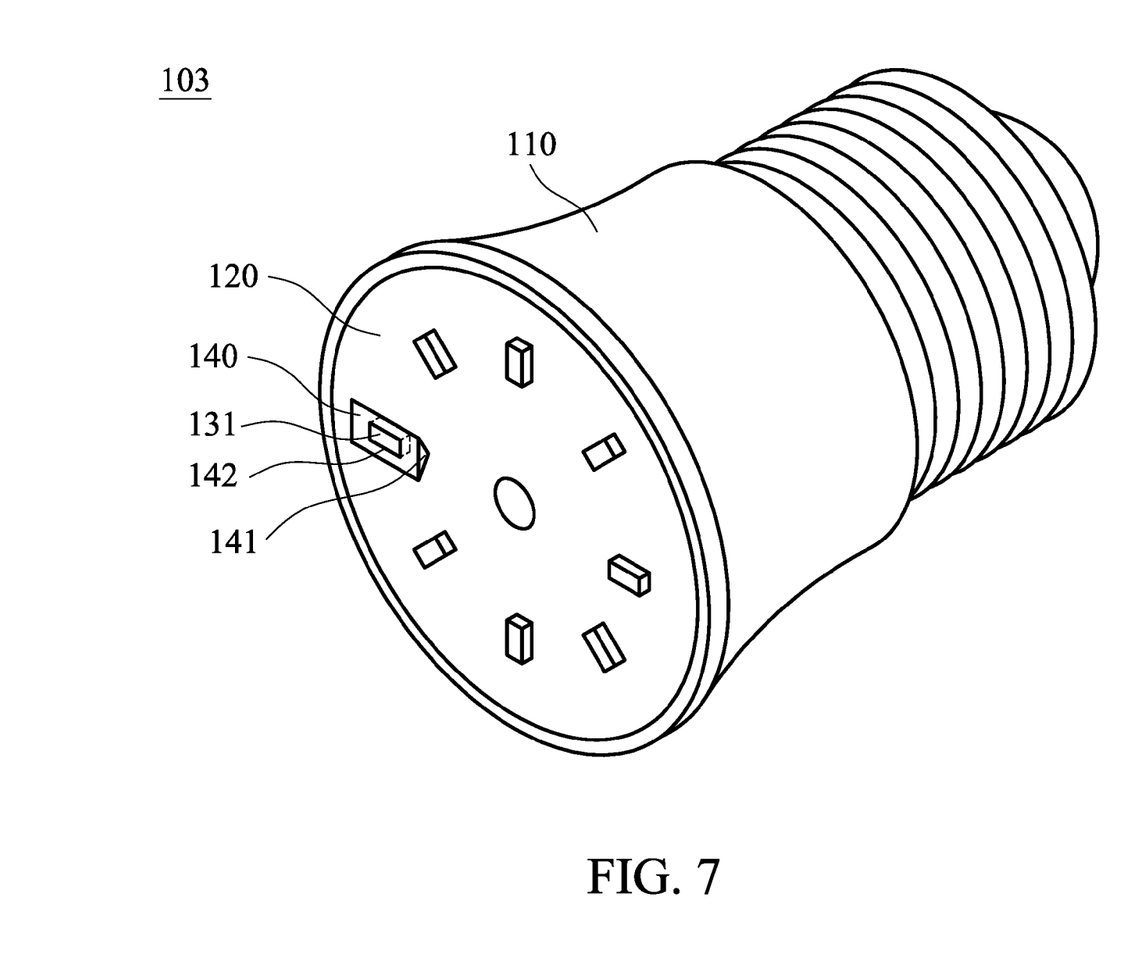
FIG. 7 shows an illumination device of a third embodiment of the invention.

FIG. 7 shows an illumination device 103 of a third embodiment of the invention, wherein only the planar antennas are utilized (only the first radiator is utilized, or only the first and second radiators are utilized). The illumination device 103 of the third embodiment can be utilized to detect biological signals (for example, heart beat or breathing). In a modified example, the illumination device 103 of the third embodiment includes an image capturing device (for example, disposed in the center of the stage 120) to capture an image, and the captured image data is transmitted via the first radiator 140.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term).

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:
1. An illumination device, comprising:
a lamp body;
a stage, disposed in the lamp body;
a light reflector reflecting light emitted from at least one first light source and including a first surface and a second surface opposite to the first surface, the light reflector being disposed on the stage with the first surface facing the stage;
said at least one first light source, disposed on the second surface of the light reflector;
a first radiator disposed above the light reflector in a direction perpendicular to the second surface of the light reflector, spaced a distance apart from the second surface of the light reflector and facing the second surface of the light reflector, the first radiator being formed with a first opening accommodating the first light source, the first light source being disposed between the first radiator and the light reflector in said direction, wherein the first radiator transmits a first wireless signal; and
a first feed conductor, connected to the first radiator.
2. The illumination device as claimed in claim 1, wherein the light reflector is made of conductive material, and the light reflector is grounded.
3. The illumination device as claimed in claim 1, wherein a top surface of the first radiator is recessed toward the light reflector to form a recessed portion, a lower part of the recessed portion defining said opening.
4. The illumination device as claimed in claim 3, wherein the first light source is disposed in the recessed portion.

5. The illumination device as claimed in claim 3, wherein the light reflector is made of conductive material, the light reflector is grounded, and the recessed portion contacts the light reflector.

6. The illumination device as claimed in claim 1, wherein the first radiator is rectangular, the first radiator comprises a first axis, a second axis, a first side and a second side, the first axis is perpendicular to the second axis, the first side is parallel to the first axis, the second side is parallel to the second axis, the first feed conductor connects the first radiator and the second side, the first opening is located on a location overlapping with the second axis, and a length of the first side is a half of an operational wavelength of the first wireless signal.

7. The illumination device as claimed in claim 6, further comprising a feed source, wherein the first feed conductor is shaped as an isosceles triangle, the first feed conductor has a first end connected to the first feed source and a second end connected to the first feed source, and the first end corresponds to the first axis.

8. The illumination device as claimed in claim 6, further comprising a plurality of first light sources and a plurality of first openings, the first light sources are disposed in the first openings respectively, and the first openings are arranged along the second axis.

9. The illumination device as claimed in claim 8, wherein a length of the second side is greater than the operational wavelength of the first wireless signal.

10. The illumination device as claimed in claim 1, further comprising:

a second light source, disposed on the second surface of the light reflector, and spaced apart from the first light source;

a second radiator, disposed above the light reflector with a distance on the second surface of the light reflector, and formed with a second opening accommodating the second light source, wherein the second radiator transmits the first wireless signal; and a second feed conductor, connected to the second radiator, wherein the first radiator emits the first wireless signal, and the second radiator receives the first wireless signal.

11. The illumination device as claimed in claim 10, further comprising:

a first monopole antenna, disposed on the stage, wherein the first monopole antenna emits a second wireless signal; and a second monopole antenna, disposed on the stage, wherein the second monopole antenna receives the second wireless signal.

12. The illumination device as claimed in claim 11, wherein the first radiator and the second radiator have a first radiation direction, the first monopole antenna and the second monopole antenna have a second radiation direction, and the second radiation direction is not parallel to the first radiation direction.

13. The illumination device as claimed in claim 10, further comprising a plurality of third light sources disposed on the light reflector, wherein the first light source, the second light source and the third light source are arranged annularly.

* * * * *